US011370130B2

(12) United States Patent
Endo

(10) Patent No.: US 11,370,130 B2
(45) Date of Patent: Jun. 28, 2022

(54) GRIPPING SYSTEM AND GRIPPING METHOD

(71) Applicant: THK CO., LTD., Tokyo (JP)

(72) Inventor: Yoshimasa Endo, Tokyo (JP)

(73) Assignee: THK CO., LTD., Tokyo (JP)

( * ) Notice: Subject to any disclaimer, the term of this patent is extended or adjusted under 35 U.S.C. 154(b) by 167 days.

(21) Appl. No.: 16/763,647

(22) PCT Filed: Oct. 25, 2018

(86) PCT No.: PCT/JP2018/039756
§ 371 (c)(1),
(2) Date: May 13, 2020

(87) PCT Pub. No.: WO2019/097980
PCT Pub. Date: May 23, 2019

(65) Prior Publication Data
US 2020/0269445 A1    Aug. 27, 2020

(30) Foreign Application Priority Data
Nov. 15, 2017    (JP) .............................. JP2017-219877

(51) Int. Cl.
B25J 15/02    (2006.01)
B25J 15/10    (2006.01)
(Continued)

(52) U.S. Cl.
CPC .............. *B25J 15/10* (2013.01); *B25J 9/102* (2013.01); *B25J 9/12* (2013.01); *B25J 9/1612* (2013.01); *B25J 15/0213* (2013.01)

(58) Field of Classification Search
CPC .... B25J 15/0009; B25J 15/0213; B25J 15/10; B25J 9/102; B25J 9/12; B25J 9/1612; Y10S 901/38
(Continued)

(56) References Cited

U.S. PATENT DOCUMENTS

| 6,918,622 B2 * | 7/2005 | Kim ......................... B25J 15/10 294/106 |
| 7,168,748 B2 * | 1/2007 | Townsend .............. B25J 9/1612 294/106 |

(Continued)

FOREIGN PATENT DOCUMENTS

| JP | 11-156778 A | 6/1999 |
| JP | 2003-245883 | * 9/2003 |

(Continued)

OTHER PUBLICATIONS

International Search Report dated Jan. 8, 2019, issued in counterpart International Application No. PCT/JP2018/039756, w/English translation (4 pages).

*Primary Examiner* — Dean J Kramer
(74) *Attorney, Agent, or Firm* — WHDA, LLP

(57) ABSTRACT

The present invention improves the stability while suppressing increases in the size and heat generation amount of motors used in a hand mechanism. The hand mechanism includes a first driving mechanism for driving a first joint portion of each finger portion and a second driving mechanism for driving a second joint portion of each finger portion, the second joint portion being positioned further away from a tip end portion of the finger portion than the first joint portion. Further, the second driving mechanism is a mechanism having smaller back-drivability than the first driving mechanism. When pressing force is to be exerted on the object from gripping finger portions that are in contact with the object, the motors of the first driving mechanisms are driven to rotate in a direction for bending the first joint portions while the motors of the second driving mechanisms are held in a stopped state.

5 Claims, 16 Drawing Sheets

(51) Int. Cl.
*B25J 9/10* (2006.01)
*B25J 9/16* (2006.01)
*B25J 9/12* (2006.01)

(58) Field of Classification Search
USPC .......................................................... 294/106
See application file for complete search history.

(56) References Cited

U.S. PATENT DOCUMENTS

| | | | | |
|---|---|---|---|---|
| 7,454,995 | B2* | 11/2008 | Koyama | B25J 9/102 |
| | | | | 74/490.03 |
| 7,795,832 | B2* | 9/2010 | Kawabuchi | B25J 9/102 |
| | | | | 318/568.11 |
| 8,827,337 | B2* | 9/2014 | Murata | B25J 15/0009 |
| | | | | 294/106 |
| 2006/0012197 | A1* | 1/2006 | Anderson | B25J 15/0028 |
| | | | | 294/106 |
| 2013/0175816 | A1 | 7/2013 | Kawasaki et al. | |

FOREIGN PATENT DOCUMENTS

| | | |
|---|---|---|
| JP | 2003-245883 A | 9/2003 |
| JP | 2003-266357 A | 9/2003 |
| JP | 2017-13157 A | 1/2017 |
| WO | 2012/039479 A1 | 3/2012 |

* cited by examiner

[Fig. 1]
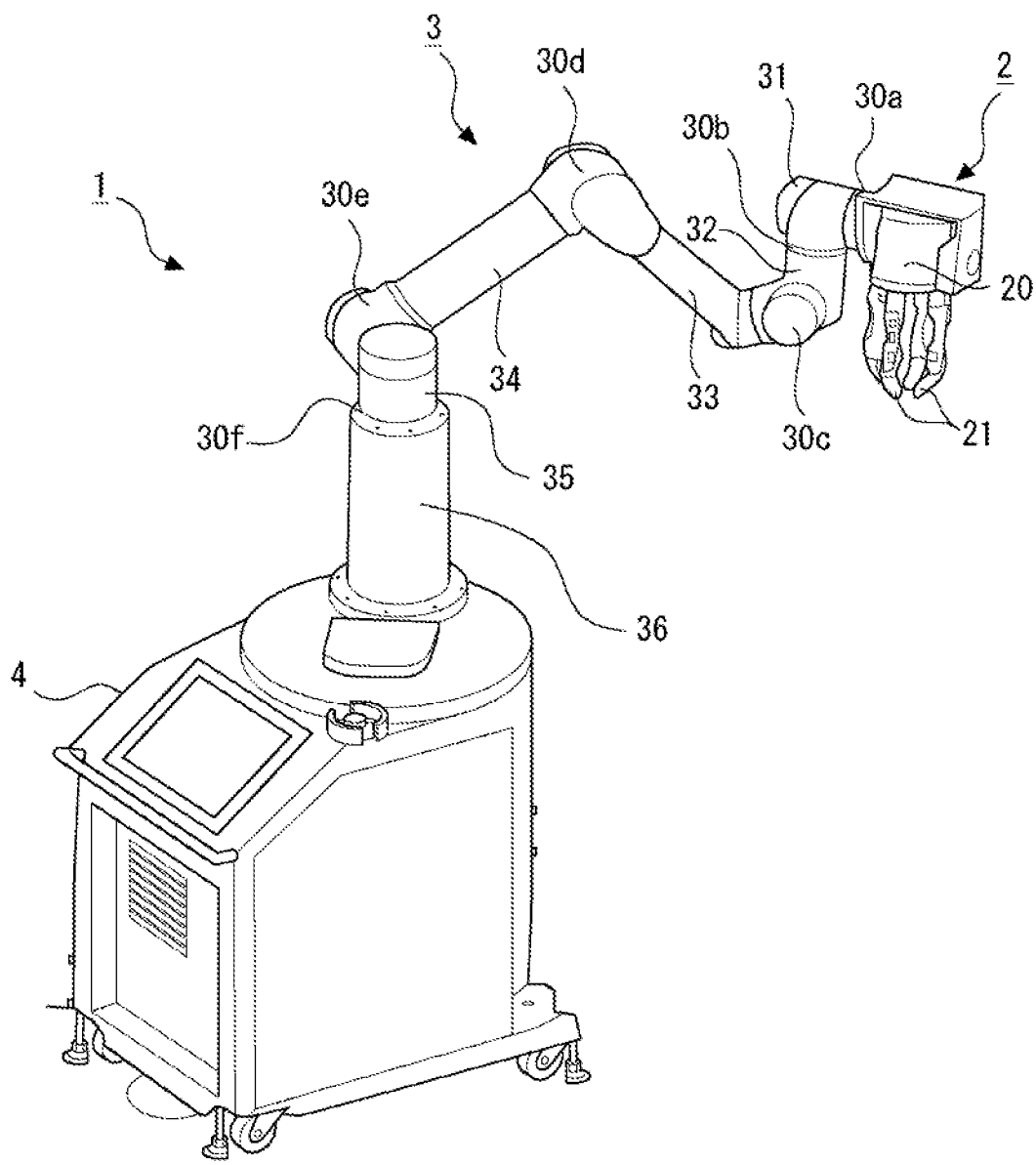

[Fig. 2]
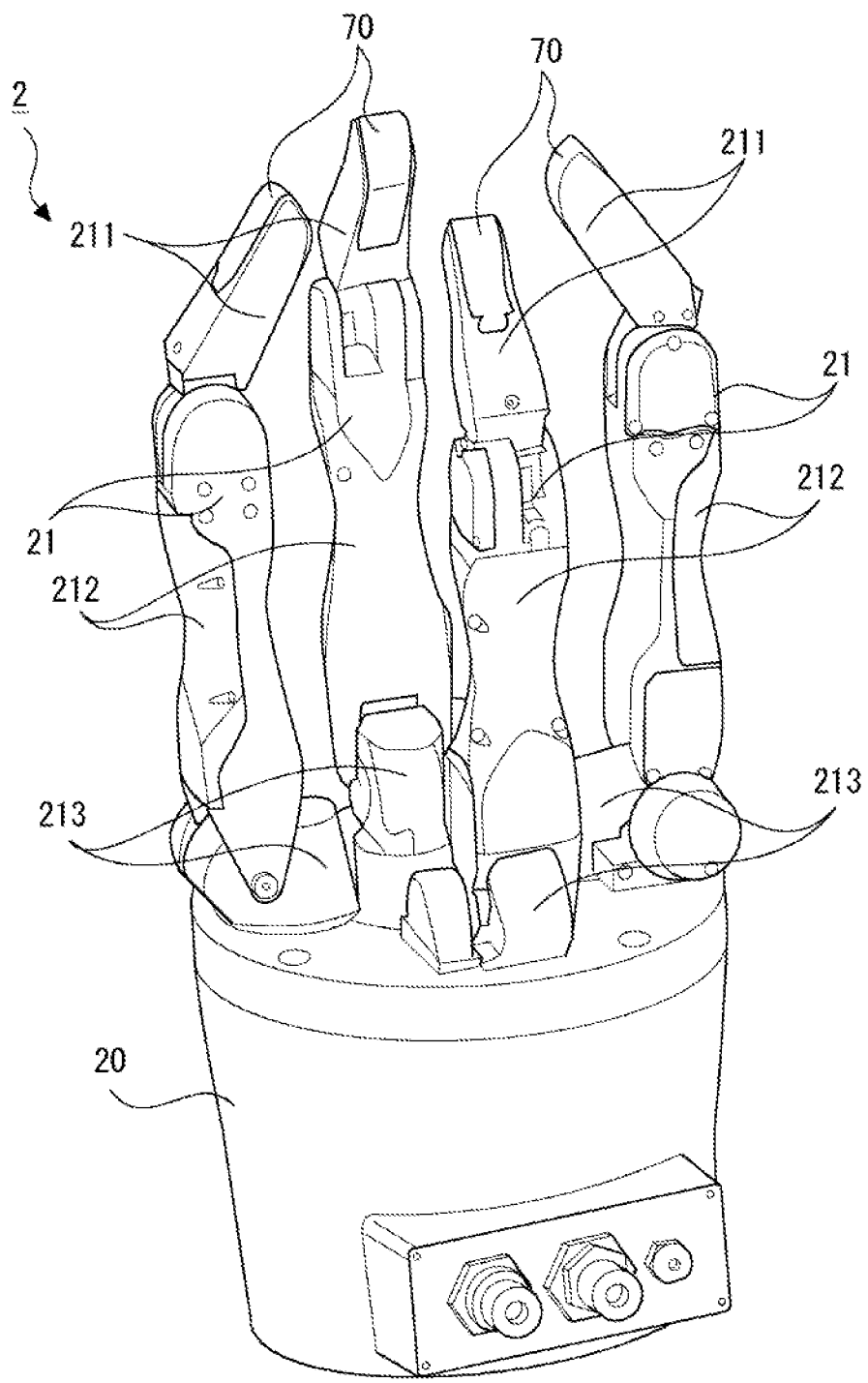

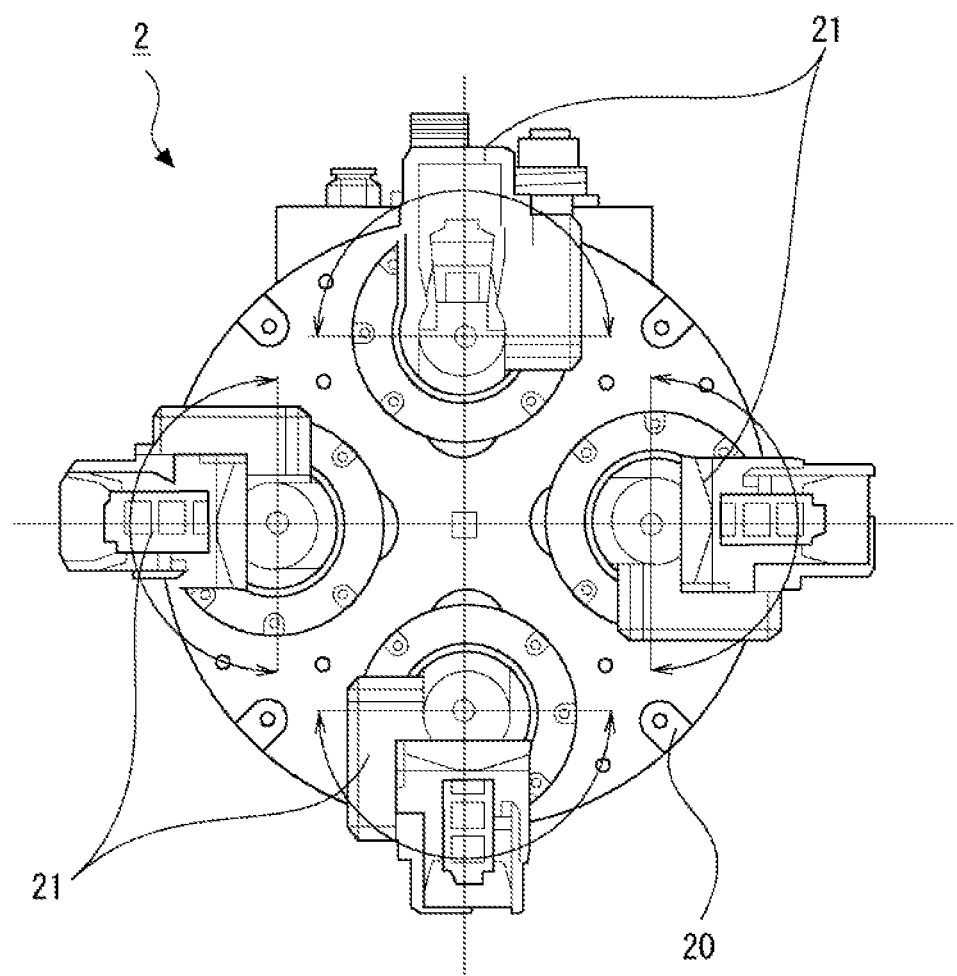
[Fig. 3]

[Fig. 4]
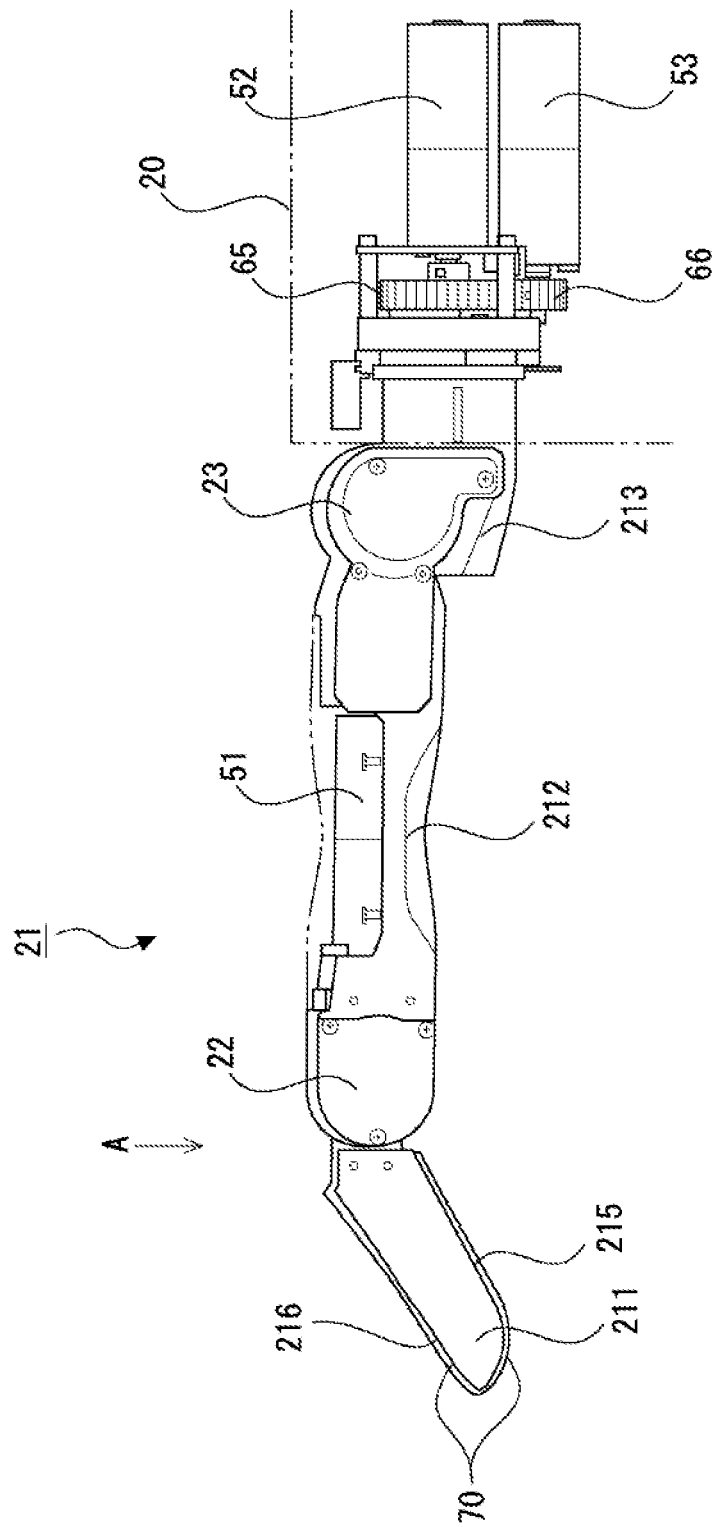

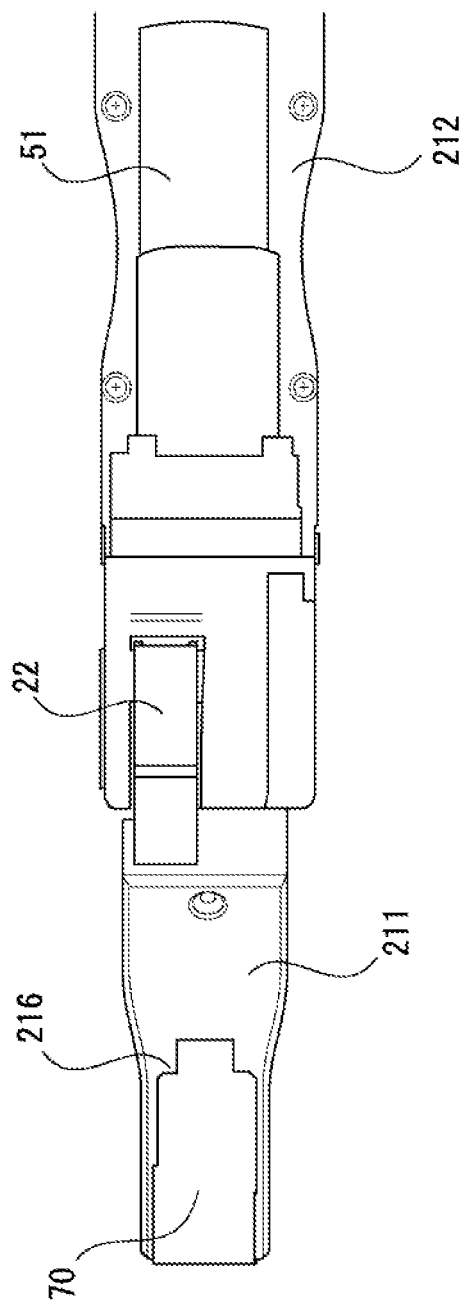
[Fig. 5]

[Fig. 6]
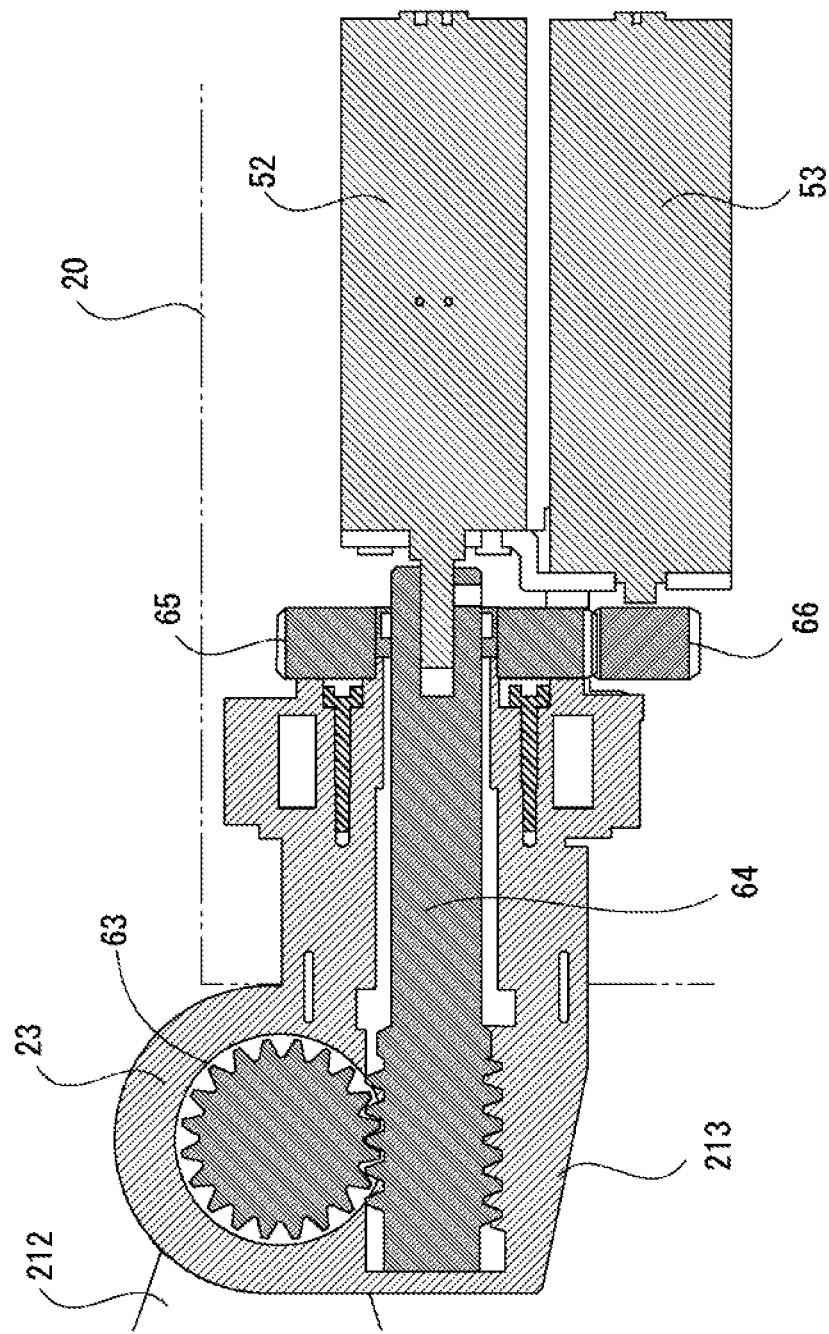

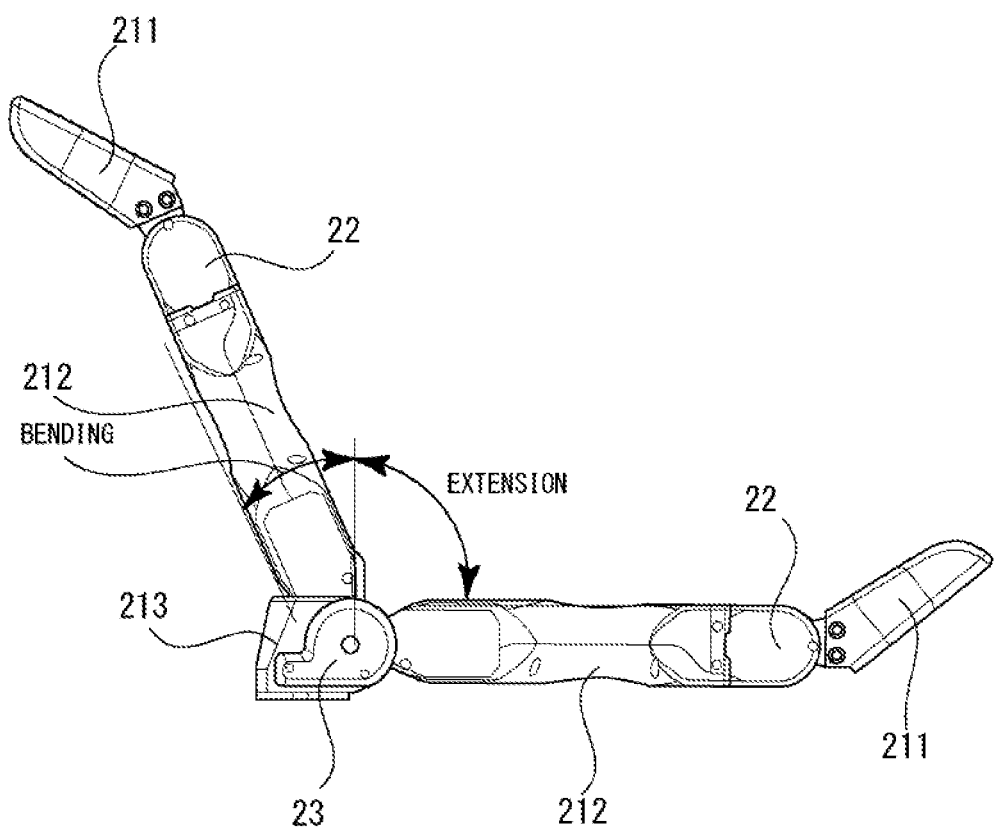
[Fig. 7]

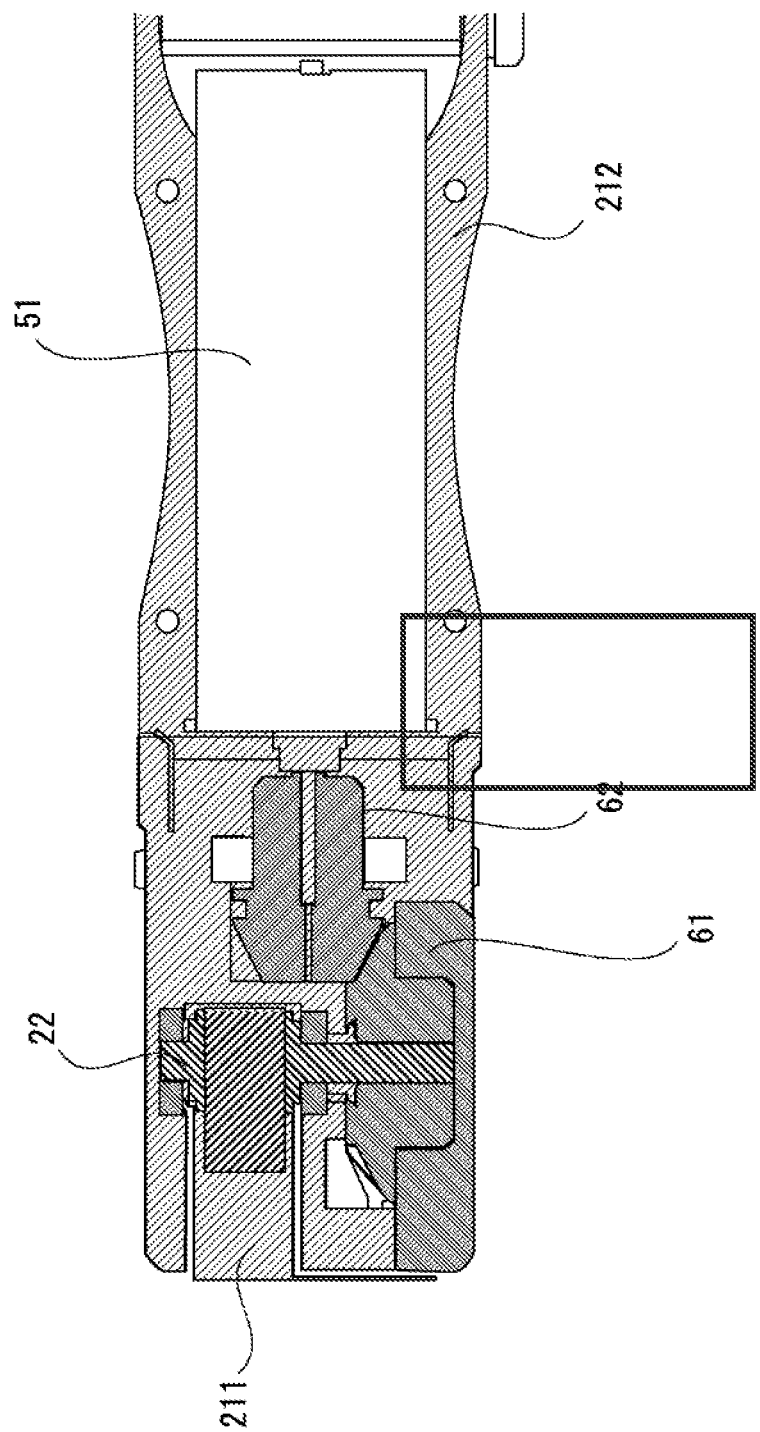
[Fig. 8]

[Fig. 9]
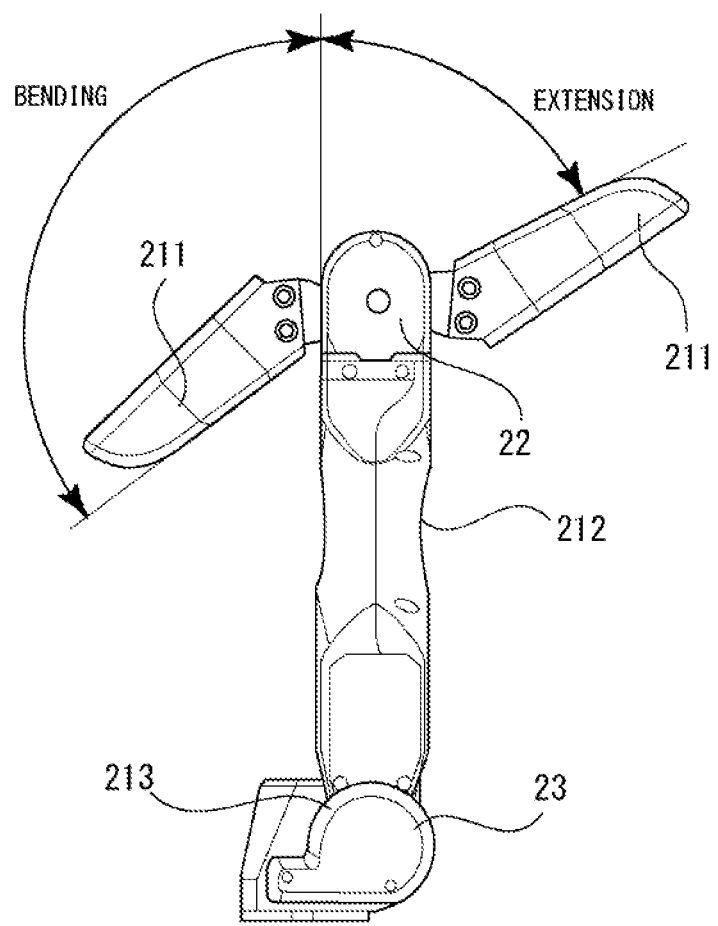

[Fig. 10]
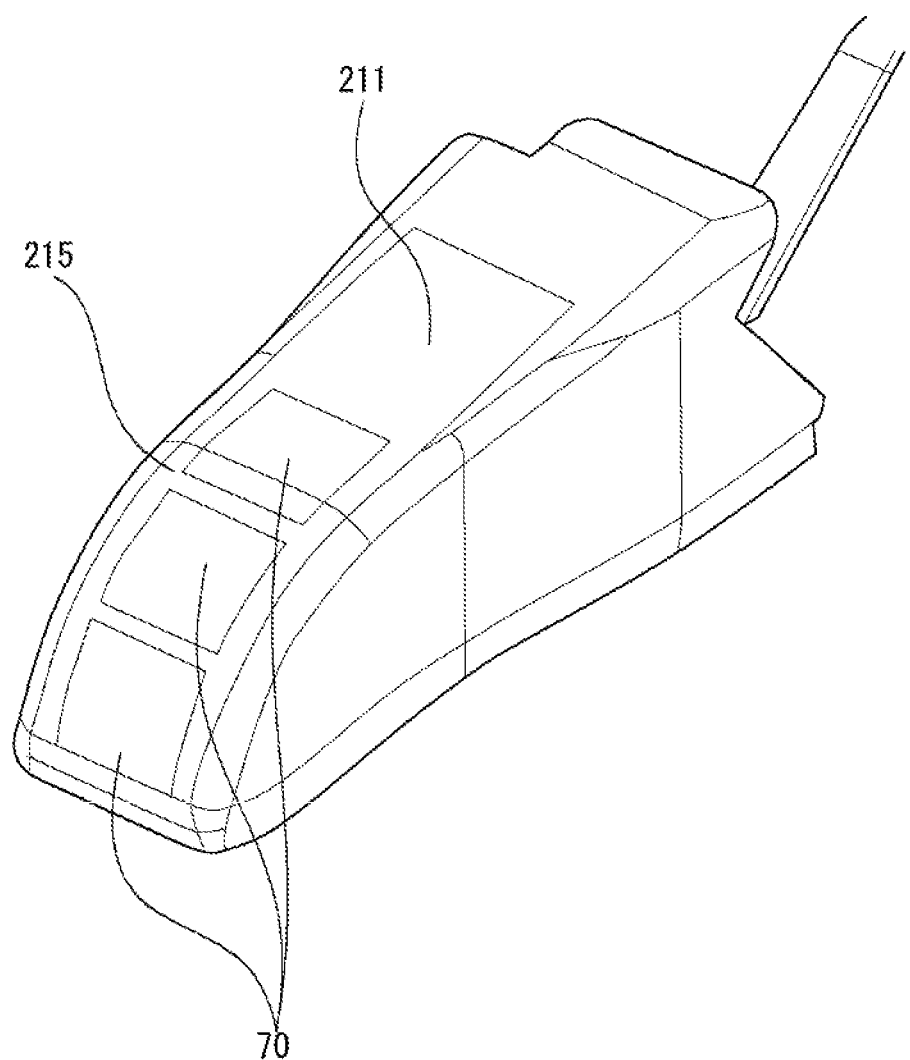

[Fig. 11]
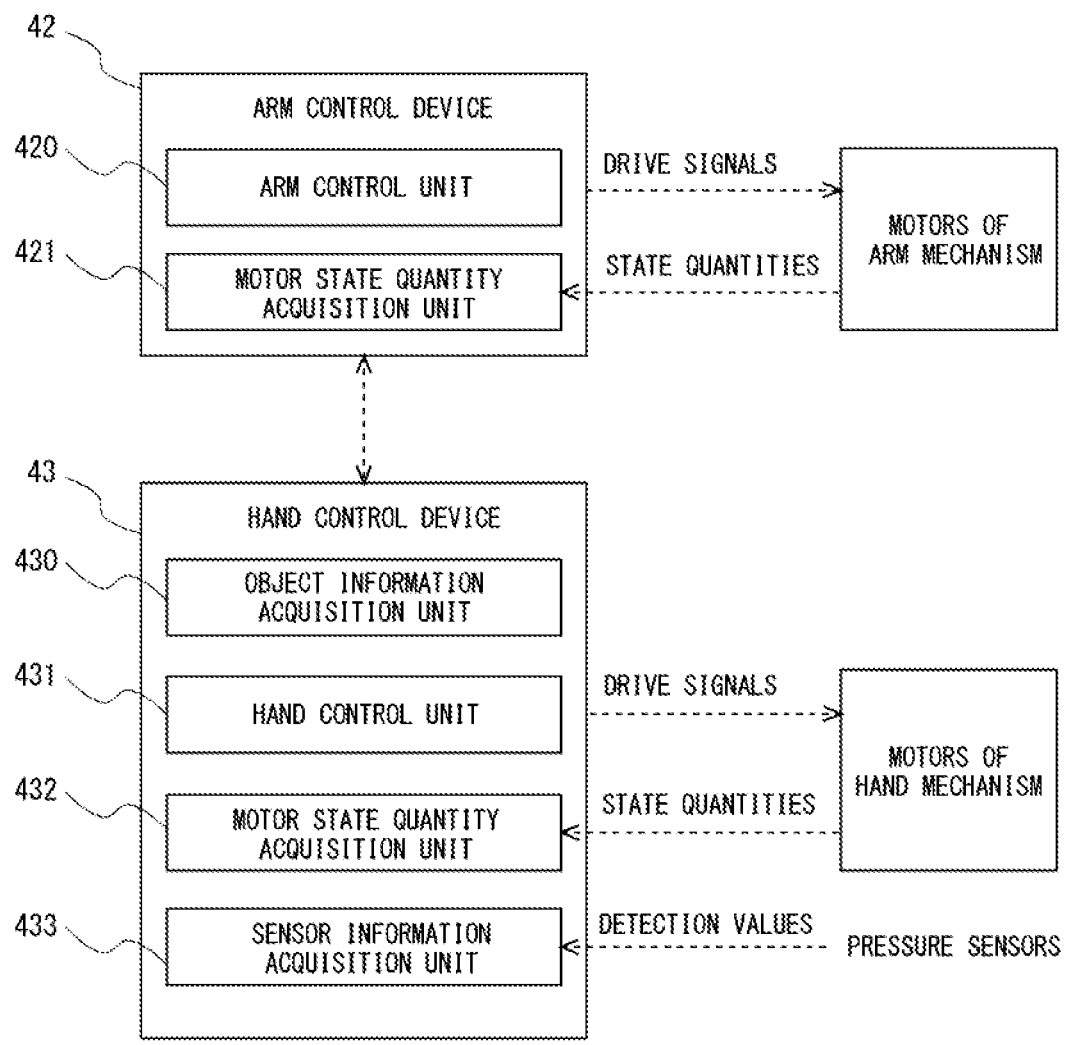

[Fig. 12A]
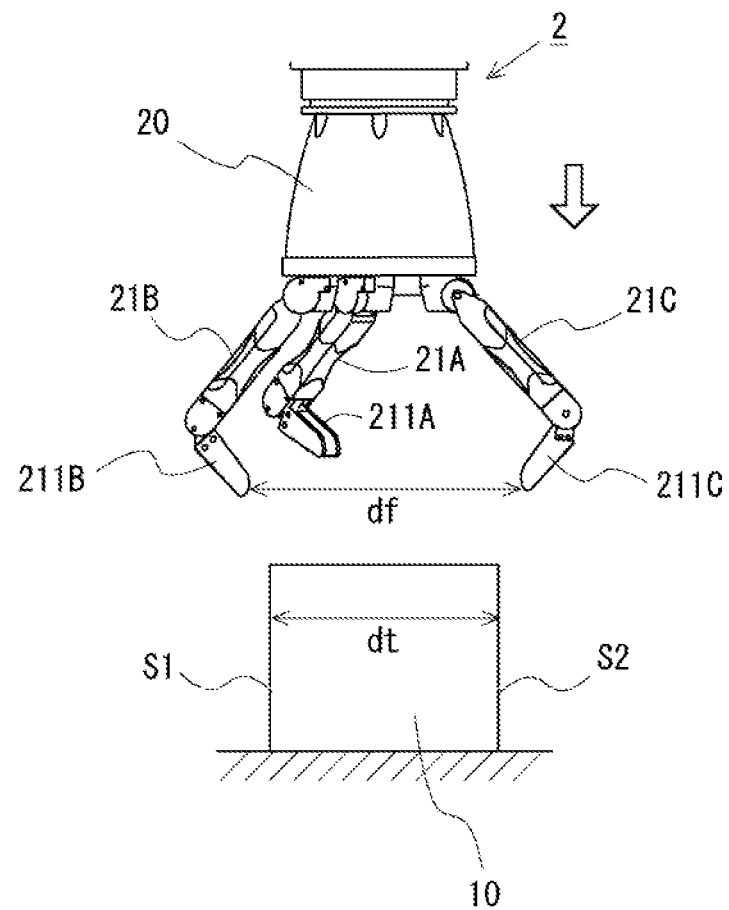

[Fig. 12B]
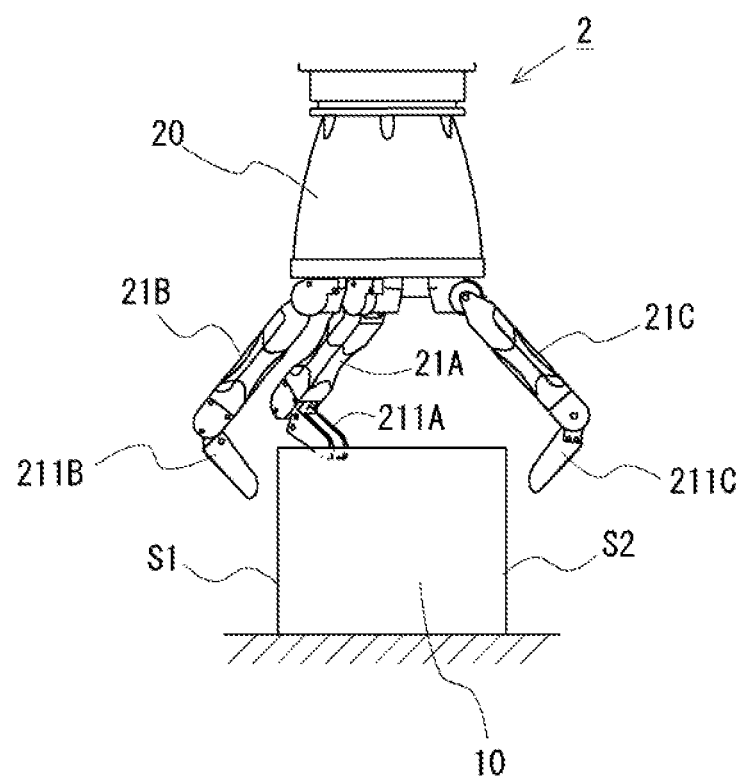

[Fig. 12C]
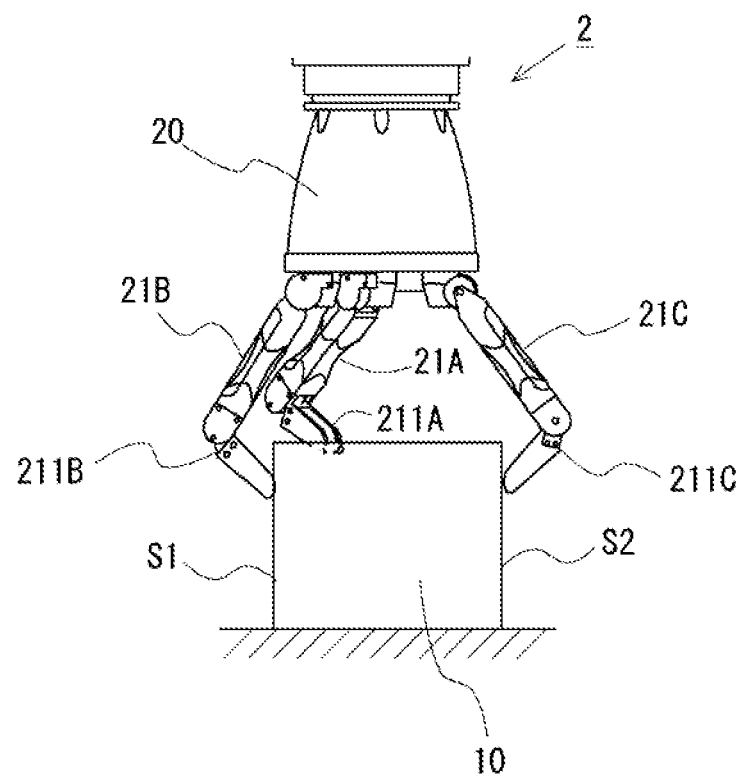

[Fig. 12D]
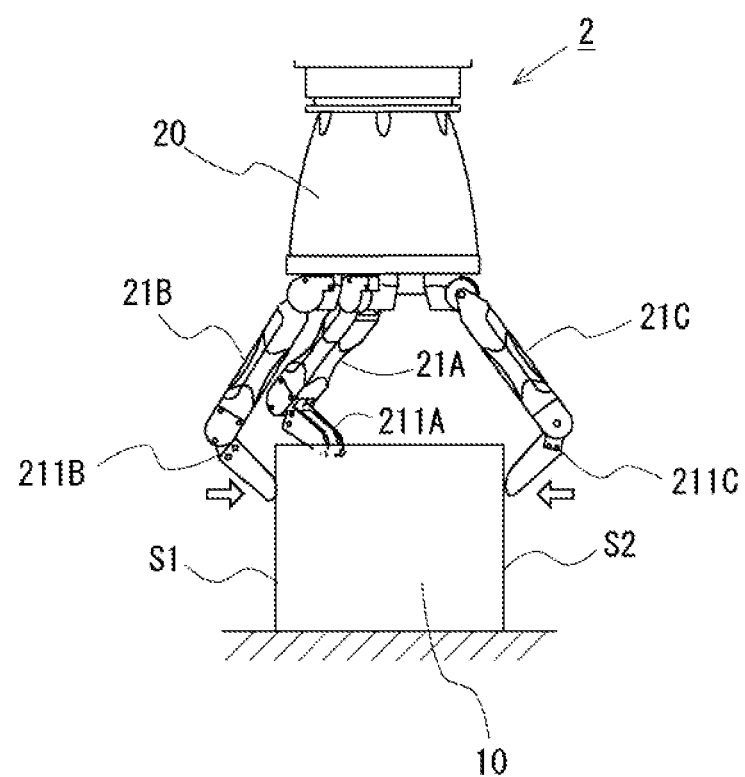

[Fig. 13]
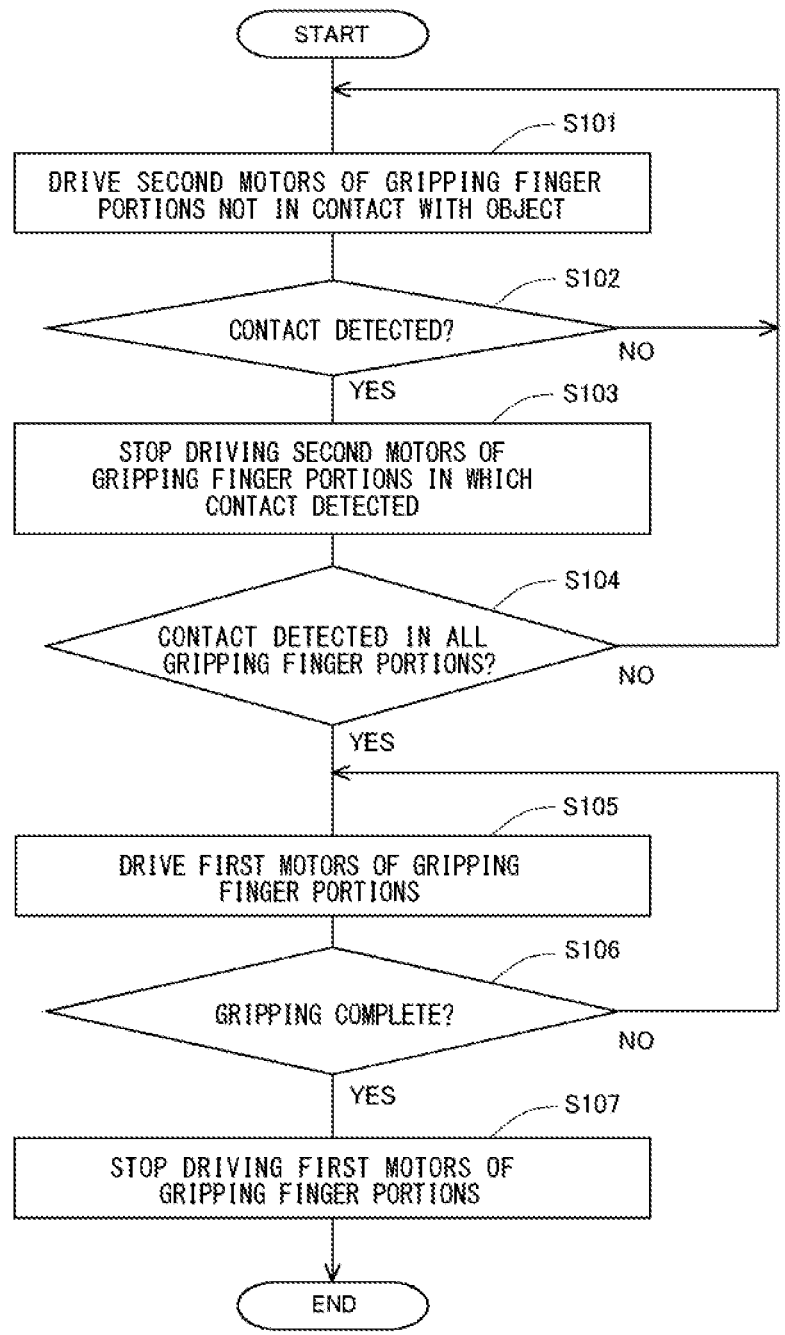

GRIPPING SYSTEM AND GRIPPING METHOD

TECHNICAL FIELD

The present invention relates to a gripping system including a hand mechanism for gripping an object using a plurality of finger portions, and a gripping method for gripping an object using the hand mechanism.

BACKGROUND ART

A hand mechanism attached to a robot or the like has been developed in the prior art. Further, mechanisms that grips an object using a plurality of finger portions are available as hand mechanisms. For example, PTL 1 discloses a hand mechanism (a palm structure of a hand) having a plurality of finger portions, each finger portion being structured to include a plurality of joint portions. In the hand mechanism disclosed in PTL 1, each of the joint portions on each finger portion is constituted by a rotary shaft of a gear (a spur gear). Furthermore, a motor and a worm gear are provided as a drive unit for each of the joint portions of each finger portion. Rotary force from the motor is transmitted to the gear constituting the joint portion through the worm gear and a reduction gear, and as a result, the joint portion is driven.

CITATION LIST

Patent Literature

[PTL 1] Japanese Patent Application Publication No. 2003-266357

SUMMARY OF INVENTION

Technical Problem

In a hand mechanism, to ensure that the object is gripped with stability by the plurality of finger portions, appropriate pressing force must be exerted on the object continuously from the finger portions during the period in which the object is gripped. Here, motors may be used in the hand mechanism as driving mechanisms for driving the joint portions of the finger portions. For example, each joint portion may be driven by driving the motor to rotate and transmitting the rotary force thereof to the rotary shaft of the joint portion using a gear (a spur gear, a bevel gear, a worm gear, or the like). Moreover, when pressing force is to be exerted on the object from the finger portions in a case where motors are used as the driving mechanisms, the motors are driven to rotate in a direction for bending the joint portions of the finger portions in a state where tip end portions of the finger portions are in contact with the object.

If an attempt is made at this time to exert sufficient pressing force on the object by driving the joint portions of the finger portions using the driving mechanisms of the joint portions, which are comparatively far away from the tip end portions contacting the object, the output of the motors must be increased in order to resist moments generated by the loads acting on the tip end portions of the finger portions. However, increasing the output of the motors may invite problems such as an increase in the size of the motors and an increase in the amount of heat generated by the motors.

The present invention has been designed in consideration of the problem described above, and an object thereof is to provide a technique for a gripping system including a hand mechanism that grips an object using a plurality of finger portions, by which an object can be gripped with stability while suppressing increases in the size and heat generation amount of motors used to drive joint portions of the respective finger portions.

Solution to Problem

A gripping system according to the present invention includes a hand mechanism that grips an object using a plurality of finger portions, each finger portion of the hand mechanism being formed with a first joint portion and a second joint portion positioned further away from a tip end portion of the finger portion than the first joint portion, the hand mechanism including a first driving mechanism for driving the first joint portion of each finger portion and a second driving mechanism for driving the second joint portion of each finger portion, and the first driving mechanism and the second driving mechanism each being configured to include a motor, the second driving mechanism being a mechanism having smaller back-drivability than the first driving mechanism, wherein the gripping system comprises a control device that controls the hand mechanism when the object is to be gripped by the hand mechanism, and when the object is to be gripped by the hand mechanism, in a state where the respective tip end portions of gripping finger portions to be used to grip the object, among the plurality of finger portions, are in contact with the object, the control device drives the motors provided in the first driving mechanisms of the gripping finger portions to rotate in a direction for bending the first joint portions while maintaining the motors provided in the second driving mechanisms of the gripping finger portions in a stopped state, whereby pressing force is exerted on the object from the gripping finger portions.

Advantageous Effects of Invention

According to the present invention, in a gripping system including a hand mechanism that grips an object using a plurality of finger portions, the object can be gripped with stability while suppressing increases in the size and heat generation amount of motors used to drive joint portions of the respective finger portions.

BRIEF DESCRIPTION OF DRAWINGS

FIG. 1 is a schematic view showing a configuration of a robot arm according to an embodiment.

FIG. 2 is a perspective view of a hand mechanism according to the embodiment.

FIG. 3 is a top view of the hand mechanism according to the embodiment.

FIG. 4 is a side view of a finger portion of the hand mechanism according to the embodiment.

FIG. 5 is a view showing a tip end portion side of the finger portion of the hand mechanism according to the embodiment from the direction of an arrow A in FIG. 4.

FIG. 6 is a view showing an internal structure of a part of a base portion near a connecting portion connected to the finger portion and internal structures of a base end portion and a second joint portion of the finger portion on the hand mechanism according to the embodiment.

FIG. 7 is a view showing a movement range of the second joint portion of the finger portion on the hand mechanism according to the embodiment.

FIG. 8 is a view showing internal structures of a first joint portion and a second finger link portion of the finger portion on the hand mechanism according to the embodiment.

FIG. 9 is a view showing a movement range of the first joint portion of the finger portion on the hand mechanism according to the embodiment.

FIG. 10 is a view showing an arrangement of pressure sensors on a first link portion of the finger portion on the hand mechanism according to the embodiment.

FIG. 11 is a block diagram showing function units included respectively in an arm control device and a hand control device according to the embodiment.

FIG. 12A is a first view showing a state of the hand mechanism in time series during execution of approach operation control according to the embodiment.

FIG. 12B is a second view showing a state of the hand mechanism in time series during execution of the approach operation control according to the embodiment.

FIG. 12C is a first view showing a state of the hand mechanism in time series during execution of gripping operation control according to the embodiment.

FIG. 12D is a second view showing a state of the hand mechanism in time series during execution of the gripping operation control according to the embodiment.

FIG. 13 is a flowchart showing a flow of the gripping operation control according to the embodiment.

DESCRIPTION OF EMBODIMENTS

At least a first joint portion and a second joint portion are formed on each finger portion of a hand mechanism according to the present invention. On each finger portion, the second joint portion is formed in a position further away from a tip end portion of the finger portion than the first joint portion. The first joint portion is driven by a first driving mechanism, and the second joint portion is driven by a second driving mechanism. The first driving mechanism and the second driving mechanism are configured to each include a motor. In other words, in each driving mechanism, when the motor rotates, the resulting rotary force is transmitted to a rotary shaft of the joint portion via a transmission mechanism, whereby the joint portion is driven. Further, in the hand mechanism according to the present invention, a mechanism having smaller back-drivability than the first driving mechanism is used as the second driving mechanism.

Here, when an object is to be gripped by the hand mechanism, the finger portions used to grip the object, among the plurality of finger portions, will be referred to as gripping finger portions. In order to grip the object using the gripping finger portions, the tip end portions of the gripping finger portions must be brought into contact with the object, and pressing force must be exerted on the object from the gripping finger portions. At this time, in the gripping system according to the present invention, a control device drives the motors of the first driving mechanisms provided in the gripping finger portions to rotate in a direction for bending the first joint portions in a state where the tip end portions of the gripping finger portions are in contact with the object while holding the motors of the second driving mechanisms provided in the gripping finger portions in a stopped state, and as a result, pressing force is exerted on the object from the gripping finger portions. In other words, only the motors of the first driving mechanisms are used as drive sources when pressing force is exerted on the object from the gripping finger portions. Note that while the motors of the second driving mechanisms are held in the stopped state, a current supply to the motors may be either continued or stopped.

In the hand mechanism according to the present invention, as described above, the second driving mechanism has smaller back-drivability than the first driving mechanism. Here, back-drivability is an index indicating the drivability of the driving mechanism in a case where external force is input into the driving mechanism from the opposite side to the side on which driving force is input from the drive source (the motor). For example, when the driving mechanism is configured to include gears as a transmission mechanism for transmitting the rotary force of the motor to the rotary shaft of the joint portion, the back-drivability is an index indicating the rotatability of the intermeshed gears in a case where external force is input into the gears from the opposite side to the side on which driving force is input from the motor. In other words, in the hand mechanism according to the present invention, the second driving mechanism is more difficult to drive than the first driving mechanism when external force is input from the opposite side to the side on which driving force is input from the motor. Therefore, even when pressing force is exerted on the object from the gripping finger portions by driving the first joint portions using the first driving mechanisms while the motors of the second driving mechanisms of the gripping finger portions are held in the stopped state, back-driving of the second driving mechanisms, or in other words driving of the second joint portions in an extension direction, can be suppressed. As a result, sufficient pressing force can be exerted on the object from the gripping finger portions even when only the motors of the first driving mechanisms are driven.

Further, the first joint portion of the finger portion is positioned closer to the tip end portion than the second joint portion. Accordingly, a moment that is generated by a load applied to the tip end portion of the finger portion is smaller when the first joint portion is bent than when the second joint portion is bent. Therefore, when the first joint portions are bent, sufficient pressing force can be exerted on the object from the gripping finger portions with a smaller amount of torque than when the second joint portions are bent. Hence, by driving the first joint portions of the gripping finger portions using the first driving mechanisms while holding the motors of the second driving mechanisms in the stopped state so that pressing force is exerted on the object from the gripping finger portions, the object can be gripped by the hand mechanism with stability while suppressing increases in the size and heat generation amount of the motors provided respectively in the driving mechanisms.

Embodiment

A specific embodiment of the present invention will be described below on the basis of the figures. Unless specified otherwise, the technical scope of the invention is not limited only to the dimensions, materials, shapes, relative arrangements, and so on of the constituent components described in this embodiment.

Here, a case in which the hand mechanism and gripping system according to the present invention are applied to a robot arm will be described. FIG. 1 is a schematic view showing a configuration of the robot arm according to this embodiment. A robot arm 1 includes a hand mechanism 2, an arm mechanism 3, and a support portion 4. The hand mechanism 2 is attached to one end of the arm mechanism 3. Further, the other end of the arm mechanism 3 is attached to the support portion 4. The hand mechanism 2 includes a base portion 20 connected to the arm mechanism 3, and four finger portions 21 provided on the base portion 20. Note that the configuration of the hand mechanism 2 will be described in detail below.

Arm Mechanism

The arm mechanism 3 includes a first arm link portion 31, a second arm link portion 32, a third arm link portion 33, a fourth arm link portion 34, a fifth arm link portion 35, and a connecting member 36. The base portion 20 of the hand mechanism 2 is connected to a first joint portion 30a formed on one end side of the first arm link portion 31 of the arm mechanism 3. A motor (not shown) for rotating the hand mechanism 2 relative to the first arm link portion 31 about the first am link portion 31 is provided in the first joint portion 30a. The other end side of the first arm link portion 31 is connected to one end side of the second arm link portion 32 by a second joint portion 30b. The first arm link portion 31 and the second arm link portion 32 are connected so that respective central axes thereof intersect perpendicularly. A motor (not shown) for rotating the first arm link portion 31 relative to the second arm link portion 32 about the other end side thereof is provided in the second joint portion 30b. Further, the other end side of the second arm link portion 32 is connected to one end side of the third arm link portion 33 by a third joint portion 30c. A motor (not shown) for rotating the second arm link portion 32 relative to the third arm link portion 33 is provided in the third joint portion 30c.

Similarly, the other end side of the third arm link portion 33 is connected to one end side of the fourth arm link portion 34 by a fourth joint portion 30d. Furthermore, the other end side of the fourth arm link portion 34 is connected to the fifth arm link portion 35 by a fifth joint portion 30e. A motor (not shown) for rotating the third arm link portion 33 relative to the fourth arm link portion 34 is provided in the fourth joint portion 30d. Moreover, a motor (not shown) for rotating the fourth arm link portion 34 relative to the fifth arm link portion 35 is provided in the fifth joint portion 30e. Further, the fifth arm link portion 35 is connected to the connecting member 36, which is disposed to extend vertically from the support portion 4, by a sixth joint portion 30f. The fifth arm link portion 35 and the connecting member 36 are connected so that respective central axes thereof are coaxial. A motor (not shown) for rotating the fifth arm link portion 35 about the fifth am link portion 35 and the connecting member 36 is provided in the sixth joint portion 30f. By configuring the arm mechanism 3 in this manner, the arm mechanism 3 can be realized as a mechanism having six degrees of freedom, for example.

Hand Mechanism

Next, the configuration of the hand mechanism 2 will be described on the basis of FIGS. 2 to 10. FIG. 2 is a perspective view of the hand mechanism 2, and FIG. 3 is a top view of the hand mechanism 2. Note that in FIG. 3, arrows represent rotation ranges of the respective finger portions 21. As shown in FIGS. 2 and 3, in the hand mechanism 2, the four finger portions 21 are disposed on the base portion 20 at equal angular intervals (mere specifically, at 90 deg intervals) on a circumference centering on a longitudinal direction (a perpendicular direction to the paper surface in FIG. 3) axis of the hand mechanism 2. Further, the four finger portions 21 all have identical structures and identical lengths. Note, however, that the operations of the respective finger portions 21 are controlled independently.

FIGS. 4 to 10 are views illustrating the configuration of one finger portion 21 of the hand mechanism 2 and driving mechanisms of it. FIG. 4 is a side view of the finger portion 21. Note that in FIG. 4, the base portion 20 is depicted in a see-through state so that the part of the internal structure of the finger portion 21 positioned inside the base portion 20 can also be seen. Further, FIG. 5 is a view showing a tip end portion side of the finger portion 21 from the direction of an arrow A in FIG. 4. Note that in FIGS. 4 and 5, a part of a second finger link portion 212 of the finger portion 21, to be described below, is depicted in a see-through state so that the internal structure of the second finger link portion 212 can also be seen.

As shown in FIGS. 2 and 4, each finger portion 21 includes a first finger link portion 211, the second finger link portion 212, and a base end portion 213. The base end portion 213 of the finger portion 21 is connected to the base portion 20. Here, the base end portion 213 is connected to the base portion 20 so as to be capable of rotating relative to the base portion 20 about a longitudinal direction (a perpendicular direction to the paper surface in FIG. 3) axis of the finger portion 21, as shown by the arrows in FIG. 3. Further, on the finger portion 21, one end of the second finger link portion 212 is connected to the base end portion 213. A second joint portion 23 is formed in a connecting portion between the second finger link portion 212 and the base end portion 213.

Here, a driving mechanism of the base end portion 213 and a driving mechanism of the second joint portion 23 will be described on the basis of FIG. 6. FIG. 6 is a view showing an internal structure of a part of the base portion 20 near a connecting portion connected to the finger portion 21 and internal structures of the base end portion 213 and the second joint portion 23 of the finger portion 21. As shown in FIG. 6, a gear 65, a gear 66, a second motor 52, and a third motor 53 are provided in the interior of the base portion 20. The gear 65 is a gear for rotating the entire finger portion 21 and is connected to a rotary shaft of the base end portion 213. The gear 66 is connected to a rotary shaft of the third motor 53. The gear 65 and the gear 66 are meshed to each other. With this configuration, when the third motor 53 rotates, resulting rotary force is transmitted to the rotary shaft of the base end portion 213 through the two gears 65, 66. As a result, the base end portion 213 is driven to rotate, and accordingly, the entire finger portion 21 is driven to rotate within the range indicated by the arrows in FIG. 3. Thus, the gear 65, the gear 66, and the third motor 53 together form a driving mechanism for driving the base end portion 213.

Further, a worm wheel 63 and a worm 64 meshed to the worm wheel 63 are provided in the interior of the second joint portion 23. The worm wheel 63 is connected to a rotary shaft of the second finger link portion 212 in the second joint portion 23. Furthermore, the worm 64 is connected to a rotary shaft of the second motor 52 provided in the interior of the base portion 20. With this configuration, when the second motor 52 is driven to rotate, resulting rotary force is transmitted to the rotary shaft of the second finger link portion 212 by the worm 64 and the worm wheel 63. As a result, the second finger link portion 212 is driven to rotate relative to the base end portion 213. Thus, the worm wheel 63, the worm 64, and the second motor 52 together form a driving mechanism (also referred to hereafter as the "second driving mechanism") for driving the second joint portion 23. In other words, a worm gear is used as the gear of the second driving mechanism. Here, FIG. 7 is a view showing a movement range of the second joint portion 23 of the finger portion 21, realized by the second driving mechanism. As shown in FIG. 7, the second joint portion 23 is formed to be bendable and extendable. Note that the driving force generated by the second motor 52 and the driving force generated by the third motor 53 are transmitted to the respective operation subjects thereof independently.

Further, as shown in FIGS. 4 and 5, in the finger portion 21, one end of the first finger link portion 211 is connected to the other end of the second finger link portion 212. K first joint portion 22 is formed in a connecting portion between the first finger link portion 211 and the second finger link portion 212. Here, a driving mechanism of the first joint portion 22 will be described on the basis of FIG. 8. FIG. 8 is a view showing internal structures of the first joint portion 22 and the second finger link portion 212 in the finger portion 21. Two intermeshed bevel gears 61, 62 are provided in the interior of the first joint portion 22. One of the bevel gears 61 is connected to a rotary shaft of the first finger link portion 211 in the first joint portion 22. The other bevel gear 62 is connected to a rotary shaft of a first motor 51 provided in the interior of the second finger link portion 212. With this configuration, when the first motor 51 is driven to rotate, resulting rotary force is transmitted to the rotary shaft of the first finger link portion 211 by the two bevel gears 61, 62. As a result, the first finger link portion 211 is driven to rotate relative to the second finger link portion 212. Thus, the bevel gear 61, the bevel gear 62, and the first motor 51 together form a driving mechanism (also referred to hereafter as the "first driving mechanism") for driving the first joint portion 22. In other words, bevel gears are used as the gears of the first driving mechanism. Here, FIG. 9 is a view showing a movement range of the first joint portion 22 of the finger portion 21, realized by the driving force of the first driving mechanism. As shown in FIG. 9, the first joint portion 22 is formed to be bendable and extendable.

Furthermore, as shown in FIGS. 2 and 4, in the embodiment, in the finger portion 21, the second finger link portion 212 on the base portion 20 side (the base end portion 213 side) of the first joint portion 22 is longer than the first finger link portion 211 on the tip end portion side of the first joint portion 22.

Moreover, as shown in FIGS. 2, 4, 5, and 10, in the embodiment, a pressure sensor 70 is provided on the tip end side of the first finger link portion 211 of the finger portion 21. The pressure sensor 70 is a sensor for detecting external force (pressure) acting on the tip end portion of the first finger link portion 211. Furthermore, as shown in FIG. 4, the pressure sensor 70 is provided on the first finger link portion 211 on both a wall surface (also referred to hereafter as a "bending-side wall surface") 215 or a bending direction side of the first joint portion 22 and a wall surface (also referred to hereafter as an "extension-side wall surface") 216 on an extension direction side of the first joint portion 22. Here, in this embodiment, the bending-side wall surface 215 on the tip end side of the first finger link portion 211 is formed in a curved surface shape. Accordingly, as shown in FIG. 10, a plurality of pressure sensors 70 may be arranged on the bending-side wall surface 215 on the tip end side of the first finger link portion 211 so as to extend along the curved surface shape thereof. Note that a sensor employing any known method, such as a piezoelectric sensor, a strain gauge, or an electrostatic capacitance sensor, may be used as the pressure sensor 70.

Support Portion

Next, configurations of an arm control device 42 and a hand control device 43 built into the support portion 4 will be described on the basis of FIG. 11. The arm control device 42 is a control device for controlling the arm mechanism 3 of the robot arm 1. The hand control device 43 is a control device for controlling the hand mechanism 2 of the robot arm 1. FIG. 11 is a block diagram showing respective function units included in the arm control device 42 and the hand control device 43.

The arm control device 42 is configured to include a plurality of drivers that generate drive signals for driving the motors provided in the respective joint portions of the arm mechanism 3, the drive signal from each driver being supplied to the corresponding motor. The arm control device 42 also includes a computer having a calculation processing device and a memory. The arm control device 42 further includes an arm control unit 420 and a motor state quantity acquisition unit 421 as function units. These function units are formed by having the computer included in the arm control device 42 execute a predetermined control program.

The arm control unit 420 controls the motors provided respectively in the joint portions 30a, 30b, 30c, 30d, 30e, 30f of the arm mechanism 3 by supplying the drive signals from the respective drivers thereto on the basis of object information acquired by an object information acquisition unit 430, to be described below, which serves as a function unit of the hand control device 43. The arm control unit 420 moves the arm mechanism 3 by controlling the respective motors, whereby the hand mechanism 2 is moved to a predetermined gripping position suitable for gripping an object. Further, each of the motors provided in the joint portions 30a, 30b, 30c, 30d, 30e, 30f of the arm mechanism 3 is provided with an encoder (not shown) for detecting state quantities (a rotation position and a rotation speed of the rotary shaft of the motor, and so on) relating to the rotation state of the corresponding motor. The state quantities of the motors, detected by the encoders of the respective motors, are input into the motor state quantity acquisition unit 421 of the arm control device 42. Then, on the basis of the state quantities of the respective motors, input into the motor state quantity acquisition unit 421, the arm control unit 420 servo-controls the respective motors so that the hand mechanism 2 moves to the predetermined gripping position, for example.

Further, the hand control device 43 is configured to include a plurality of drivers that generate drive signals for driving the motors provided in the hand mechanism 2, the drive signal from each driver being supplied to the corresponding motor. The hand control device 43 also includes a computer having a calculation processing device and a memory. The hand control device 43 includes the object information acquisition unit 430, a hand control unit 431, a motor state quantity acquisition unit 432, and a sensor information acquisition unit 433 as function units. These function units are formed by having the computer included in the hand control device 43 execute a predetermined control program.

The object information acquisition unit 430 acquires object information, which is information relating to an object to be gripped by the hand mechanism 2. Here, the object information includes information relating to the shape, dimensions, and position of the object, information indicating the surrounding environment of the object (information relating to items other than the object existing on the periphery of the object, for example information relating to the shape of a container housing the object or a row of objects in the container), and so on. The object information acquisition unit 430 may also acquire object information input by a user. Further, when a visual sensor for capturing an image that includes the object is provided, the object information acquisition unit 430 may acquire object information from an image captured by the visual sensor.

Furthermore, the hand control unit 431 controls the first motors 51, the second motors 52, and the third motors 53 for driving the respective finger portions 21 of the hand mechanism 2 by supplying drive signals from the drivers thereto on the basis of the object information acquired by the object information acquisition unit 430. For example, the hand control unit 431 controls the first motors 51, the second motors 52, and the third motors 53 of the hand mechanism 2 so that the object is gripped by the hand mechanism 2, which has been moved to the predetermined gripping position by controlling the arm mechanism 3 using the arm control unit 420. Moreover, each first motor 51, each second motor 52, and each third motor 53 of the hand mechanism 2 is provided with an encoder (not shown) for detecting state quantities (the rotation position and rotation speed of the rotary shaft of the motor, and so on) relating to the rotation state of the corresponding motor. The state quantities of the motors 51, 52, 53, detected by the encoders of the motors 51, 52, 53, are input into the motor state quantity acquisition unit 432 of the hand control device 43. Then, on the basis of the state quantities of the motors 51, 52, 53, input into the motor state quantity acquisition unit 432, the hand control unit 431 servo-controls the motors 51, 52, 53 of the respective finger portions 21 so that the plurality of finger portions 21 grip the object, for example.

The hand control device 43 also includes the sensor information acquisition unit 433. Detection values from the pressure sensors 70 provided in the first finger link portion 211 of each finger portion 21 of the hand mechanism 2 are input into the sensor information acquisition unit 433. The hand control unit 431 can detect that the corresponding finger portion 21 has come into contact with the object, on the basis of the detection values from the pressure sensors 70 acquired by the sensor information acquisition unit 433, and can control the motors 51, 52, 53 of each of the finger portions 21 on the basis of the detection signals.

Note that when an object is to be gripped by the hand mechanism 2, the object must be clamped between at least two finger portions 21. Hereafter, the finger portions used to clamp the object 10 when the object is gripped by the hand mechanism 2 will also be referred to as the "gripping finger portions". According to the hand mechanism 2, an object can be gripped using two of the four finger portions 21 as the gripping finger portions, using three of the four finger portions 21 as the gripping finger portions, or using all four finger portions 21 as the gripping finger portions.

Approach Operation Control and Gripping Operation Control

Here, approach operation control and gripping operation control performed by the robot arm 1 according to this embodiment to grip an object will be described on the basis of FIGS. 12A to 12D. In order to grip an object using the gripping finger portions of the hand mechanism 2, before the object is clamped by the gripping finger portions, the hand mechanism 2 must be moved to a predetermined gripping position in which the object is positioned between the tip end portions of at least two gripping finger portions. Control for moving the hand mechanism 2 to the predetermined gripping position in this manner will be referred to as approach operation control. Further, control for clamping the object between the gripping finger portions after the hand mechanism 2 has been positioned in the predetermined gripping position will be referred to as gripping operation control. Note that FIGS. 12A to 12D show an operation performed in a case where the second finger portion 213 and the third finger portion 21C of the hand mechanism 2 are used as the gripping finger portions. Furthermore, for convenience, FIGS. 12A to 12D show only the first finger portion 21A, the second gripping finger portion 21B, and the third finger portion 21C of the hand mechanism 2 and do not show the fourth finger portion 21D.

In the approach operation control, as shown in FIG. 12A, first, the form of the hand mechanism 2 is controlled to an approach form in which an interval between the respective tip end portions of the second finger portion 21B and the third finger portion 21C (the tip end portion of the first finger link portion 211B of the second finger portion 21B and the tip end portion of the first finger link portion 211C of the third finger portion 21C) that are used as the gripping finger portions during gripping of the object 10 is widened to a predetermined initial interval df, which is larger than a width dt between a surface S1 (the left-side surface in FIGS. 12A to 12D) and a surface S2 (the right-side surface in FIGS. 12A to 12D) of the object 10. The hand mechanism 2 controlled to the approach form is then brought closer to the object 10. Note that a black-outlined arrow in FIG. 12A denotes the movement direction of the hand mechanism 2.

Here, the approach form is set as a form in which, when the object 10 is gripped by the second finger portion 21B and the third finger portion 21C of the hand mechanism 2, the other finger portions, i.e. the first finger portion 21A and the fourth finger portion 21D, do not contact the object 10. This approach form is determined on the basis of the information acquired by the object information acquisition unit 430 in relation to the shape and dimensions of the object 10. At this time, the predetermined initial interval df between the tip end portion of the second finger portion 213 and the tip end portion of the third finger portion 21C in the second approach form is determined on the basis of the width dt between the surface S1 and the surface S2 of the object 10, which is acquired by the object information acquisition unit 430. Further, when the form of the hand mechanism 2 is controlled to the approach form, the motors 51, 52, 53 for driving the first joint portions 22, the second joint portions 23, and the base end portions 213 of the respective finger portions 21 are servo-controlled by the hand control unit 43.

Furthermore, during the approach operation control, with the form of the hand mechanism 2 set in the approach form, the arm control device 42 servo-controls the respective motors of the arm mechanism 3 in order to move the hand mechanism 2 to the predetermined gripping position. In this case, as shown in FIG. 12B, the predetermined gripping position is a position in which the surface S1 and the surface S2 of the object 10 are positioned between the tip end portion of the second finger portion 21B and the tip end portion of the third finger portion 21C. Further, when the hand mechanism 2 is positioned in the predetermined gripping position, the arm mechanism 3 is controlled by the arm control device 42 on the basis of the position information of the object 10, acquired by the object information acquisition unit 430.

After the hand mechanism 2 has been positioned in the predetermined gripping position by the approach operation control described above, the gripping operation control is performed. In the gripping operation control, first, the finger portions of the gripping finger portions are brought into contact with the object 10. More specifically, as shown in FIG. 12C, the tip end portion of the second finger portion 213 is brought into contact with the surface S1 of the object 10, and the tip end portion of the third finger portion 21C is brought into contact with the surface S2 of the object 10. At this time, the hand control device 43 drives the respective second motors 52 of the second finger portion 21B and the third finger portion 21C to rotate in a direction for bending the second joint portions 23. At the point where the pressure sensors 70 provided on the tip end portions of the respective finger portions 21B, 21C detect contact with the object 10, the hand control device 43 stops driving the second motors 52 of the finger portions in relation to which contact has been detected. In other words, during the gripping operation control, the operations of the driving mechanisms provided in the respective joint portions of the gripping finger portions are stopped at the point where the tip end portions of the gripping finger portions contact the object 10.

Next, during the gripping operation control, pressing force must be exerted on the object 10 from the gripping finger portions. Hence, in the gripping operation control according to this embodiment, the hand control device 43 drives the first motors 51 of the first driving mechanisms provided respectively in the second finger portion 21B and the third finger portion 21C, the tip end portions of which are in contact with the object 10, to rotate in a direction for bending the first joint portions 22. Note that at this time, the second motors 52 of the second driving mechanisms are held in a stopped state. Thus, as shown by the black-outlined arrows in FIG. 12D, pressing force is exerted on the object 10 from the second finger portion 21B and the third finger portion 21C. As a result, the object 10 is gripped by the second finger portion 21B and the third finger portion 21C.

Here, as described above, in the hand mechanism 2 according to this embodiment, the two bevel gears 61, 62 are used as the gears of the first driving mechanism for driving the first joint portion 22 of each finger portion 21. Further, a worm gear constituted by the worm wheel 63 and the worm 64 is used as the gear of the second driving mechanism for driving the second joint portion 23 of each finger portion 21. A worn gear typically has extremely small back-drivability. Hence, even when pressing force is exerted on the object 10 from the gripping finger portions by driving the first motors 51 of the first driving mechanisms to rotate while holding the second motors 52 of the second driving mechanisms in a stopped state so that only the first joint portions 22 of the respective gripping finger portions are driven, back-driving of the worm gears 63, 64 can be suppressed. In other words, when pressing force is exerted on the object 10 from the gripping finger portions, unintended driving of the second joint portions 23 of the gripping finger portions in the extension direction can be suppressed. As a result, sufficient pressing force can be exerted on the object 10 from the gripping finger portions even when only the first motors 51 of the first driving mechanisms are driven.

Further, in each finger portion 21, the first joint portion 22 is positioned closer to the tip end portion than the second joint portion 23. Therefore, when pressing force is exerted on the object 10, the moment that is generated by the load applied to the tip end portion of the gripping finger portion is smaller when the first joint portion 22 is bent than when the second joint portion 23 is bent. Hence, when pressing force is exerted on the object 10 by bending the first joint portion 22, sufficient pressing force can be exerted on the object 10 from the gripping finger portions with a smaller amount of torque than when pressing force is exerted on the object 10 by bending the second joint portion 23. In other words, when an attempt is made to exert sufficient pressing force on the object 10 by bending the second joint portion 23, greater torque is required than when the first joint portion 22 is bent. Accordingly, when pressing force is exerted on the object 10 from the gripping finger portions during the gripping operation control according to this embodiment, the first joint portions 22 are driven by the first motors 51 of the first driving mechanisms while the second motors 52 of the second driving mechanisms are held in a stopped state. In other words, only the first motors 51 are used as drive sources for exerting pressing force on the object 10. As a result, the object 10 can be gripped with stability by the hand mechanism 2 while suppressing increases in the size and heat generation amount of the motors used in the driving mechanisms of the respective joint portions of the finger portions 21.

Moreover, if a worm gear is used as the gear of the first driving mechanism as well as the gear of the second driving mechanism in each of the finger portions 21 of the hand mechanism 2 according to this embodiment, and external force of some type acts on the tip end portion of the finger portion 21, the first joint portion 22 is less likely to bend or extend in response to the external force than when a different type of gear is used as the gear of the first driving mechanism. In other words, the impact generated by the external force is less likely to be absorbed by the movement of the first joint portion 22. Further, a worm gear typically has a comparatively high reduction ratio. Therefore, when a worm gear is used as the gear of the first driving mechanism, the driving efficiency of the first joint portion 22 deteriorates in comparison with a case where another type of gear is used as the gear of the first driving mechanism or a case where a bevel gear is used as the gear of the first driving mechanism. Furthermore, when a worm gear is used as the gear of the first driving mechanism, a worm wheel must be provided in the first joint portion 22 of the finger portion 21, leading to an increase in the sire of the first joint portion 22.

Therefore, in the hand mechanism 2 according to this embodiment, a bevel gear, which has larger back-drivability and a lower reduction ratio than a worm gear, is used as the gear of the first driving mechanism. Thus, when external force of some type acts on the tip end portion of the finger portion 21, the impact generated by the external force can easily be absorbed by the movement of the first joint portion 22. In addition, the driving efficiency of the first joint portion 22 can be improved. Moreover, an increase in the size of the first joint portion 22 can be suppressed. Note that a gear other than a bevel gear may be used as the gear of the first driving mechanism. By using a bevel gear as the gear of the first driving mechanism, however, it is easier to suppress an increase in the size of the first joint portion 22 than when another type of gear is used.

Flow of Gripping Operation Control

Next, a flow of the gripping operation control according to this embodiment will be described on the basis of a flowchart shown in FIG. 13. The flow of the gripping operation control is realized by executing a predetermined control program in the hand control device 43 after positioning the hand mechanism 2 in the predetermined gripping position by implementing the approach operation control.

In this flow, first, in S101, the second motor 52 of each of the gripping finger portions whose tip end portion is not in contact with the object, among the gripping finger portions of the hand mechanism 2 during the current gripping operation control, is driven in a direction for bending the second joint portion 23. As a result, the tip end portions of the gripping finger portions that are not in contact with the object move toward the object. Note that immediately after the end of the approach operation control, none of the gripping finger portions are in contact with the object. In this case, therefore, the second motors 52 of all of the gripping finger portions are driven in S101.

Next, in S102, a determination is made as to whether or not the pressure sensors 70 of the respective gripping finger portions have detected contact with the object. When the determination of S102 is negative, the processing of S101 is executed again. When the determination of S102 is affirmative, on the other hand, next, in S103, driving of the second motors 52 of the gripping finger portions in relation to which contact with the object has been detected by the pressure sensors 70 is stopped. At this time, a power supply to the second motors 52 of the gripping finger portions in relation to which contact with the object has been detected may be halted. Next, in S104, a determination is made as to whether or not contact with the object has been detected in all of the gripping finger portions. When the determination of S104 is negative, the processing of S101 is executed again. Accordingly, the second motors 52 of the gripping finger portions that are not in contact with the object continue to be driven. Note, however, that likewise in this case, driving of the second motors 52 is maintained in a stopped state in the gripping finger portions in relation to which contact with the object has already been detected. By executing the processing of S101 to S104 repeatedly, driving of the second motors 52 of the gripping finger portions is stopped successively at the point where the pressure sensors 70 detect contact with the object 10 until all of the gripping finger portions contact the object.

When the determination of S104 is affirmative, on the other hand, next, processing of S105 is executed. In S105, in a state where all of the gripping finger portions are in contact with the object, the first motors 51 of all of the gripping finger portions are driven to rotate in a direction for bending the first joint portions 22. At this time, the second motors 52 of the gripping finger portions are maintained in a stopped state. In other words, the power supply to the second motors 52 of the respective gripping finger portions may be maintained in a stopped state. As a result, the object is pressed by the gripping finger portions using only the first motors 51 of the respective gripping finger portions as drive sources. Note that in S105, it is not always necessary to operate the first motors 51 of all of the gripping finger portions. More specifically, the first motor 51 of only one of the gripping finger portions may be operated so that the object 10 is pressed by that gripping finger portion.

Next, in S106, a determination is made as to whether or not gripping of the object by the gripping finger portions is complete. Note that whether or not gripping of the object by the gripping finger portions is complete can be determined on the basis of the positions of the tip end portions of the gripping finger portions or the pressure detected by the pressure sensors 70 of the gripping finger portions. When the determination of S106 is negative, the processing of S105 is continued. When the determination of S106 is affirmative, on the other hand, next, in S107, driving of the first motors 51 of the respective gripping finger portions is stopped. As a result, the positions of the tip end portions of the gripping finger portions or the pressure exerted on the object by the gripping finger portions at that point in time is maintained. The current gripping operation control is then terminated. Note that in S107, the power supplied to the first motors 51 of the respective gripping finger portions may be maintained at the power supplied at the point where an affirmative determination was made in S106.

According to the flow described above, when the tip end portions of the gripping finger portions are brought into contact with the object, the gripping finger portions are operated using the second motors 52 of the gripping finger portions as drive sources. Note, however, that at this time, as well as driving the second joint portions 23 of the gripping finger portions, the first joint portions 22 of the gripping finger portions may also be driven using the first motors 51 of the gripping finger portions as drive sources. Meanwhile, when pressing force is exerted on the object by the gripping finger portions, the tip end portions of which are in contact with the object, the gripping finger portions are operated using only the first motors 51 of the gripping finger portions as drive sources.

MODIFIED EXAMPLES

Note that in the above embodiment, a configuration in which motors and gears are used as the driving mechanisms provided in the respective joint portions 22, 23 of the finger portions 21 of the hand mechanism 2 was described as an example, but the transmission mechanism for transmitting the rotary force of the motor to the rotary shaft of the joint portion does not necessarily have to be a gear. For example, a timing belt may be used instead of a gear. Linear actuators may also be used as the driving mechanisms of the joint portions 22, 23. Note, however, that regardless of the configuration of the driving mechanism, it is assumed that a mechanism having smaller back-drivability than the first driving mechanism for driving the first joint portion 22 is used as the second driving mechanism for driving the second joint portion 23.

REFERENCE SIGNS LIST

1 Robot arm
2 Hand mechanism
20 Base portion
21 Finger portion
22 First joint portion
23 Second joint portion
211 First finger link portion
212 Second finger link portion
213 Base end portion
3 Arm mechanism
30*a* First joint portion
30*b* Second joint portion
30*c* Third joint portion
30*d* Fourth joint portion
30*e* Fifth joint portion
30*f* Sixth joint portion
31 First arm link portion
32 Second arm link portion
33 Third arm link portion
34 Fourth arm link portion
35 Fifth arm link portion
36 Connecting member
4 Support portion
42 Arm control device
420 Arm control unit
421 Motor state quantity acquisition unit
43 Hand control device
430 Object information acquisition unit
431 Hand control unit
432 Motor state quantity acquisition unit
433 Sensor information acquisition unit
51 First motor 52 Second motor
53 Third motor
61, 62 bevel gear
63 worm wheel
64 worm
65, 66 gear
70 Pressure sensor
71 Signal transmission unit

The invention claimed is:

1. A gripping system including a hand mechanism that grips an object using a plurality of finger portions,
   each finger portion of the hand mechanism being formed with a first joint portion and a second joint portion positioned further away from a tip end portion of the finger portion than the first joint portion,
   the hand mechanism including a first driving mechanism for driving the first joint portion of each finger portion and a second driving mechanism for driving the second joint portion of each finger portion, and
   the first driving mechanism and the second driving mechanism each being configured to include a motor, the second driving mechanism being a mechanism having smaller back-drivability than the first driving mechanism, wherein
   the gripping system comprises a control device that controls the hand mechanism when the object is to be gripped by the hand mechanism, and
   when the object is to be gripped by the hand mechanism, in a state where the respective tip end portions of gripping finger portions to be used to grip the object, among the plurality of finger portions, are in contact with the object, the control device drives the motors provided in the first driving mechanisms of the gripping finger portions to rotate in a direction for bending the first joint portions while maintaining the motors provided in the second driving mechanisms of the gripping finger portions in a stopped state, whereby pressing force is exerted on the object from the gripping finger portions.

2. The gripping system according to claim 1, wherein the first driving mechanism and the second driving mechanism are each configured to include a gear as a transmission mechanism for transmitting rotary force from the motor to a rotary shaft of the joint portion, and the gear of the second driving mechanism has smaller back-drivability than the gear of the first driving mechanism.

3. The gripping system according to claim 2, wherein a type of gear other than a worm gear is used as the gear of the first driving mechanism, and a worm gear is used as the gear of the second driving mechanism.

4. The gripping system according to claim 3, wherein a bevel gear is used as the gear of the first driving mechanism.

5. A gripping method for gripping an object using a hand mechanism having a plurality of finger portions,
   each finger portion of the hand mechanism being formed with a first joint portion and a second joint portion positioned further away from a tip end portion of the finger portion than the first joint portion,
   the hand mechanism including a first driving mechanism for driving the first joint portion of each finger portion and a second driving mechanism for driving the second joint portion of each finger portion, and
   the first driving mechanism and the second driving mechanism each being configured to include a motor, the second driving mechanism being a mechanism having smaller back-drivability than the first driving mechanism,
   wherein the gripping method comprises the steps of:
   bringing the tip end portions of gripping finger portions to be used to grip the object, among the plurality of finger portions, into contact with the object when the object is to be gripped by the hand mechanism, and
   in a state where the respective tip end portions of the gripping finger portions are in contact with the object, driving the motors provided in the first driving mechanisms of the gripping finger portions to rotate in a direction for bending the first joint portions while maintaining the motors of the second driving mechanisms of the gripping finger portions in a stopped state, thereby exerting pressing force on the object from the gripping finger portions.

* * * * *